US008838638B2

(12) United States Patent
Cho et al.

(10) Patent No.: US 8,838,638 B2
(45) Date of Patent: Sep. 16, 2014

(54) METHOD AND APPARATUS FOR GENERATING AND ACCESSING METADATA IN MEDIA FILE FORMAT

(75) Inventors: Kyung-sun Cho, Seoul (KR); Jeong-hoon Park, Seoul (KR); Sun-hee Youm, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 12/103,311

(22) Filed: Apr. 15, 2008

(65) Prior Publication Data

US 2009/0046597 A1 Feb. 19, 2009

(30) Foreign Application Priority Data

Aug. 13, 2007 (KR) ........................ 10-2007-0081439

(51) Int. Cl.
*G06F 17/30* (2006.01)
*G11B 27/32* (2006.01)
*G11B 20/12* (2006.01)

(52) U.S. Cl.
CPC ...... *G11B 27/329* (2013.01); *G11B 2020/1267* (2013.01); *G06F 17/3002* (2013.01)
USPC ........... 707/764; 707/758; 707/781; 707/607; 707/707

(58) Field of Classification Search
USPC ................ 707/607, 707, 764, 758, 781, 913
See application file for complete search history.

(56) References Cited

U.S. PATENT DOCUMENTS 5,566,349 A * 10/1996 Trout .............................. 710/20
5,765,164 A 6/1998 Prasad et al.
6,283,764 B2 9/2001 Kajiyama et al.
7,432,940 B2 * 10/2008 Brook et al. ................... 345/629
7,958,264 B2 6/2011 Liang
2001/0031066 A1 10/2001 Meyer et al.
2002/0056126 A1 * 5/2002 Srikantan et al. ............... 725/87
2002/0120634 A1 8/2002 Min et al.
2005/0036763 A1 2/2005 Kato et al.
2005/0209995 A1 9/2005 Aksu et al.

FOREIGN PATENT DOCUMENTS

| CN | 1178365 A | 4/1998 |
| JP | 3-127281 A | 5/1991 |
| JP | 2001-24985 A | 1/2001 |
| JP | 2005-63594 A | 3/2005 |
| JP | 2005-176306 A | 6/2005 |
| JP | 200753463 A | 3/2007 |
| KR | 1020060100344 A | 9/2006 |
| WO | 03/098475 A1 | 11/2003 |

OTHER PUBLICATIONS

Communication dated Jan. 10, 2012, issued by the Japanese Patent Office in counterpart Japanese Application No. 2010-520923.

(Continued)

*Primary Examiner* — Sana Al Hashemi
(74) *Attorney, Agent, or Firm* — Sughrue Mion, PLLC (57) ABSTRACT

Provided are a method and apparatus for generating and accessing metadata in a media file format. The method of generating metadata in a media file format includes generating a time-track map composed of a plurality of map nodes that are distinguished according to track and unit time, and generating media objects corresponding to each of the map nodes, in which each of the map nodes includes position information of the corresponding media objects, thereby facilitating real-time reproduction and modification of content.

15 Claims, 10 Drawing Sheets (56) References Cited

OTHER PUBLICATIONS

Communication, dated Aug. 3, 2012, issued by the State Intellectual Property Office of P.R. China in counterpart Chinese Application No. 200880108030.7.

Communication, dated Jun. 19, 2012, issued by the Japanese Patent Office in counterpart Japanese Application No. 2010-520923.

Communication, dated Jul. 15, 2013, issued by the European Patent Office, in counterpart application No. 08723404.3.

Communication dated Oct. 28, 2013 issued by the Korean Intellectual Property Office in counterpart Korean Patent Application No. 10-2007-0081439.

Communication dated May 7, 2014, issued by the European Patent Office in counterpart European Application No. 08723404.3.

* cited by examiner

METHOD AND APPARATUS FOR GENERATING AND ACCESSING METADATA IN MEDIA FILE FORMAT

CROSS-REFERENCE TO RELATED PATENT APPLICATION

This application claims priority from Korean Patent Application No. 10-2007-0081439, filed on Aug. 13, 2007, in the Korean Intellectual Property Office, the disclosure of which is incorporated herein in its entirety by reference.

BACKGROUND OF THE INVENTION

1. Field of the Invention

The present invention relates to a method and apparatus for generating and accessing metadata in a media file format, and more particularly, to a method and apparatus for generating and accessing a metadata structure suitable for real-time reproduction and modification of a multimedia object in a media file format.

2. Description of the Related Art

As the manufacture and use of multimedia content increases, a need to search for and filter multimedia content has emerged, and various methods for encoding metadata have been suggested.

Metadata refers to data that briefly describes the contents and characteristics of information in a specific format in order to make the information easy to search for and easy to access information resources in various formats, i.e., information about the information resources.

Figure 1:
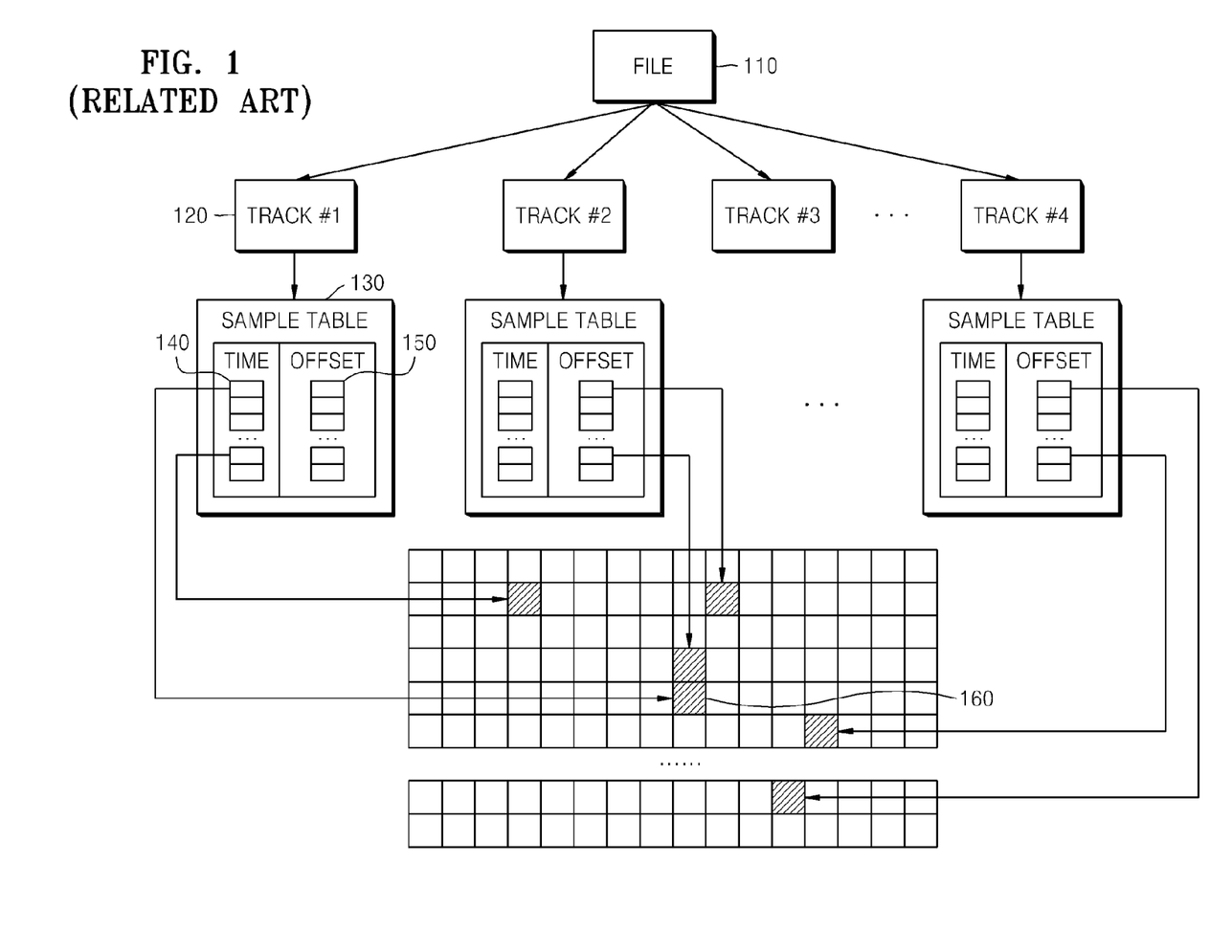
FIG. 1 illustrates a general metadata structure in a media file format.

FIG. 1 illustrates a general metadata structure in a media file format.

Referring to FIG. 1, the media file format is composed of media objects divided on a track basis. The media object means an object that constitutes content as an audio frame, a video frame, or an image frame. The track means a channel through which the media object continuously flows.

A media file 110 is divided into several tracks, and an object called a sample table 130 is linked to a track header 120 of each of the tracks. The sample tables 130 include time (offset time) information 140 during which linked media objects 160 are executed and position (offset position) information 150 of the media objects 160.

The media objects 160 are linked using the position information 150 included in the sample tables 130 and are accessed and reproduced based on the time information 140 included in the sample tables 130.

Since the general metadata structure has a static track structure, a user has to sequentially access all track headers and all sample tables even if the user desires to access only particular unit time, e.g., a time interval between 5 minutes and 6 minutes after the start of content execution in a particular track, e.g., a track #3.

Moreover, in order to update media file data, e.g., to delete track #1 and track #2, the sample tables 130 have to be moved, e.g., tracks #3 to #N have to be moved to tracks #1 to #N−2. Furthermore, the position information 150 included in the sample tables 130 has to also be changed in order to change the positions of media objects as well as to update the media file data.

SUMMARY OF THE INVENTION

The present invention provides a method and apparatus for generating and accessing metadata in a media file format in which rapid access can be provided during content reproduction and content random access, and movement of file data can be minimized during content modification.

According to one aspect of the present invention, there is provided a method of generating metadata in a media file format. The method includes generating a time-track map composed of a plurality of map nodes that are distinguished according to track and unit time, and generating media objects corresponding to each of the map nodes, in which each of the map nodes includes position information of the corresponding media objects.

Each of the map nodes may have a predetermined fixed data size.

Each of the map nodes may include time offset information or data size information of the corresponding media objects.

The method may further include generating object description data corresponding to each of the map nodes, in which each of the map nodes includes position information of the object description data.

The method may further include generating object handling data corresponding to each of the map nodes, in which each of the map nodes includes position information of the object handling data.

According to another aspect of the present invention, there is provided a method of generating metadata in a media file format. The method includes generating a time-track map composed of a plurality of map nodes that are distinguished according to track and unit time, generating individual unit data composed of link structures, each of which corresponds to each of the map nodes and includes a plurality of individual unit data nodes, and generating media objects corresponding to each of the individual unit data nodes, in which each of the map nodes includes position information of the corresponding link structure and each of the individual unit data nodes includes position information of the corresponding media objects.

Each of the map nodes and each of the individual unit data nodes may have predetermined fixed data sizes.

Each of the map nodes may include time offset information or data size information of the corresponding link structure.

Each of the individual unit data nodes may further include time offset information or data size information of the corresponding media objects.

The method may further include generating object description data corresponding to each of the map nodes, in which each of the individual unit data nodes includes position information of the object description data.

The method may further include generating object handling data corresponding to each of the map nodes, in which each of the individual unit data nodes includes position information of the object handling data.

According to another aspect of the present invention, there is provided a method of accessing metadata in a media file format. The method includes accessing a map node corresponding to track and unit time that are selected by a user in a time-track map, extracting position information of media objects corresponding to the map node, and accessing the media objects according to the position information.

According to another aspect of the present invention, there is provided a method of accessing metadata in a media file format. The method includes accessing a map node corresponding to track and unit time that are selected by a user in a time-track map, extracting position information of a link structure corresponding to the map node, accessing the link structure and individual unit data nodes included in the link structure according to the position information of the link structure, extracting position information of media objects corresponding to the individual unit data nodes, and accessing the media objects according to the position information of the media objects.

According to another aspect of the present invention, there is provided a computer-readable recording medium having recorded thereon a program for executing a method of generating metadata in a media file format. The method includes generating a time-track map composed of a plurality of map nodes that are distinguished according to track and unit time and generating media objects corresponding to each of the map nodes, in which each of the map nodes includes position information of the corresponding media objects.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE
EXEMPLARY EMBODIMENTS OF THE
INVENTION

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 2:
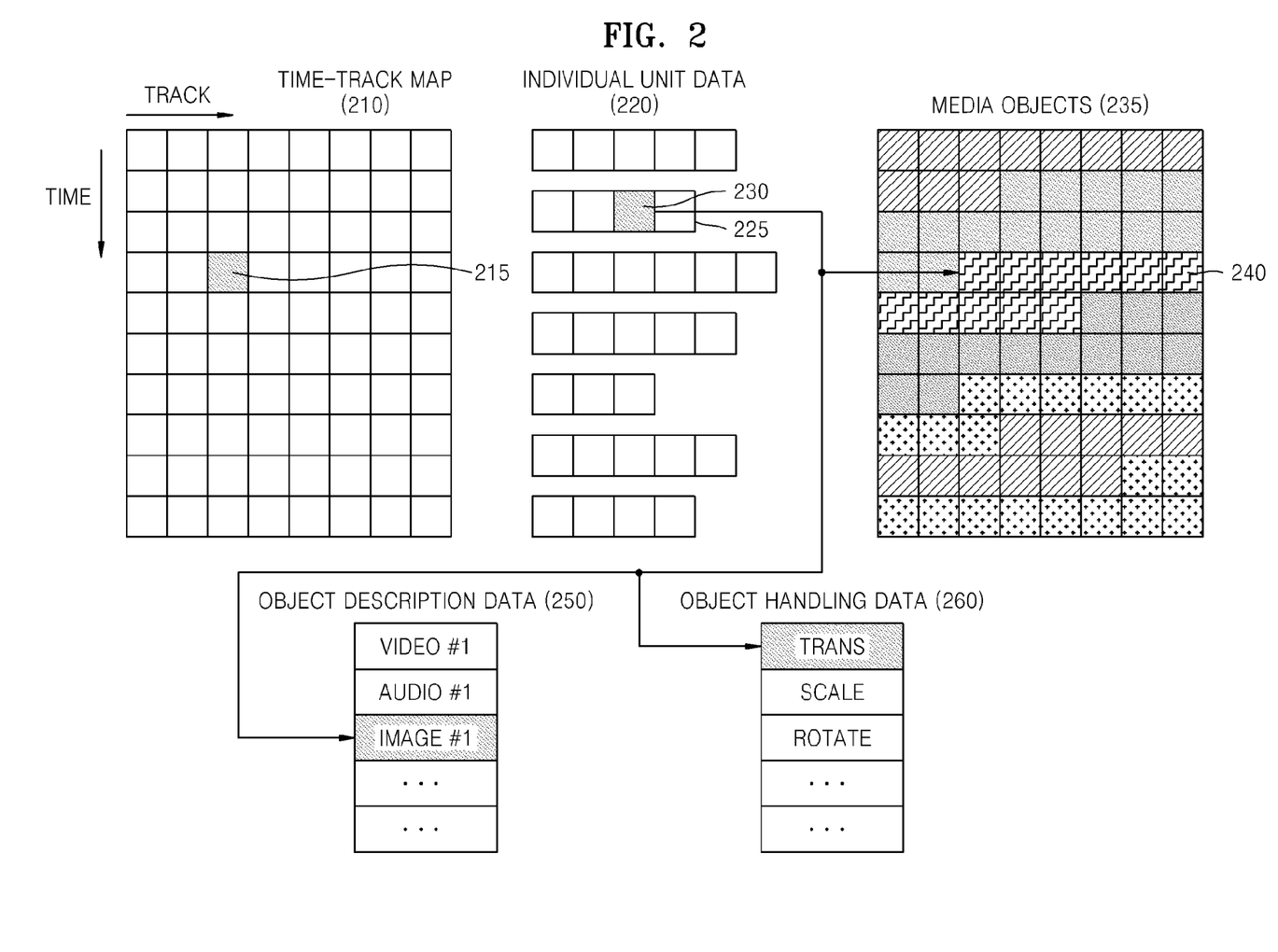
FIG. 2 illustrates a media file format according to an exemplary embodiment of the present invention.

FIG. 2 illustrates a media file format according to an exemplary embodiment of the present invention.

Referring to FIG. 2, the media file format includes a time-track map 210, individual unit data 220, media objects 235, object description data 250, and object handling data 260.

The time-track map 210 is first accessed when a media file is loaded. The time-track map 210 is composed of map nodes 215 and is shaped square. The map nodes 215 are distinguished from one another according to track and time. Each of the map nodes 215 stores fundamental information about media objects that are present per unit time.

For example, the horizontal direction of the time-track map 210 is distinguished according to track and the vertical direction of the time-track map 210 is distinguished according to unit time. In other words, in the time-track map 210, the same column means the same track and the same row means the same time.

For example, if the unit time is defined as 1 minute, the map node 215 in a fourth row and a third column of the time-track map 210 stores information about media objects that are to be reproduced in track #3 during a time interval between 3 minutes and 4 minutes after the start of execution of content. A map node in a second row and a second column stores information about media objects that are to be reproduced in track #2 during a time interval between 1 minute and 2 minutes after the start of execution of content.

Thus, a decoder that receives a media file can directly access a media object in a particular track and at a particular time without sequentially accessing all the tracks and unit times. Even when content is modified, e.g., map nodes in a third row are deleted or a track #4 is deleted, it is not necessary to modify information stored in the other map nodes.

As will be described later, the time length of the time-track map 210, the number of tracks of the time-track map 210, and the unit time of the map nodes 215 may be stored in a time-track map header included in the media file. Thus, the decoder that receives a media file can obtain information about the time-track map 210 from the time-track map header. The time length of the time-track map 210, the number of tracks of the time-track map 210, and the unit time of the map nodes 215 can be set to various values according to different circumstances.

The data size of each of the map nodes 215 preferably, but not necessarily, has a fixed value. Each of the map nodes 215 includes position (offset) information of its corresponding link structure 225 included in the individual unit data 220. Each of the map nodes 215 may also include time offset information or data size information of the link structure 225. The time offset information is information about a point of time at which reproduction of individual unit data nodes 230 included in the link structure 225 is started. The data size information may be information about the number of the individual unit data nodes 230 included in the link structure 225.

The individual unit data 220 is composed of the link structures 225 corresponding to the map nodes 215. Each of the link structures 225 is linked to each of the map nodes 215 and the link structures 225 have a data structure such as a tree structure or a linked list. Each of the link structures 225 is composed of at least one individual unit data nodes 230.

The individual unit data nodes 230 include information about media objects that are present in a single track and time. However, since there may be a plurality of media objects in a single track and time, each of the individual unit data nodes 230 includes information about each of the plurality of media objects. In other words, each of the map nodes 215 may include information about its corresponding link structure 225, and each of the link structures 225 may include information about its corresponding media objects 240. However, information included in the map nodes 215 and the individual unit data nodes 225 may also be changed in various ways.

The data size of each of the individual unit data nodes 230 preferably, but not necessarily, has a fixed value. Each of the individual unit data nodes 230 includes position (offset) information of its corresponding media objects 240. Each of the individual unit data nodes 230 may also include time offset information or data size information of its corresponding media objects 240. The time offset information of the media objects 240 is information about a point of time at which reproduction of the media objects 240 is started. For example, when time offset information stored in the map node 215 in the fourth row and the third column is 20 seconds and time offset information stored in the corresponding individual unit data node 230 is 10 seconds, the media objects 240 would be reproduced after the elapse of 3 minutes and 30 seconds.

Each of the individual unit data nodes 230 includes position information of its corresponding object description data 250. The object description data 250 has a media metadata structure including various profile information such as decoding information of the media objects 240.

Each of the individual unit data nodes 230 may also include position information of its corresponding object handling data 260. The object handling data 260 has a rendering metadata structure including information such as the rendering position or transformation of the media objects 240.

The media objects 240 correspond to each of the individual unit data nodes 230 and indicate a group of nodes marked with the same pattern.

In a modified embodiment of the present invention, the individual unit data 220 may be omitted.

In this case, the map nodes 215 of the time-track map 210 include position (offset) information of the corresponding media objects 235. As mentioned above, each of the map nodes 215 preferably has a fixed data size and may include time offset information or data size information of its corresponding media objects 235. Each of the map nodes 215 includes position information of its corresponding object description data 250 and may include position information of its corresponding object handling data 260.

The modified embodiment of the present invention may be used when the number of media objects 235 corresponding to the map nodes 215 is small, the number of tracks in a media file is small, or the unit time is large.

Figure 3:
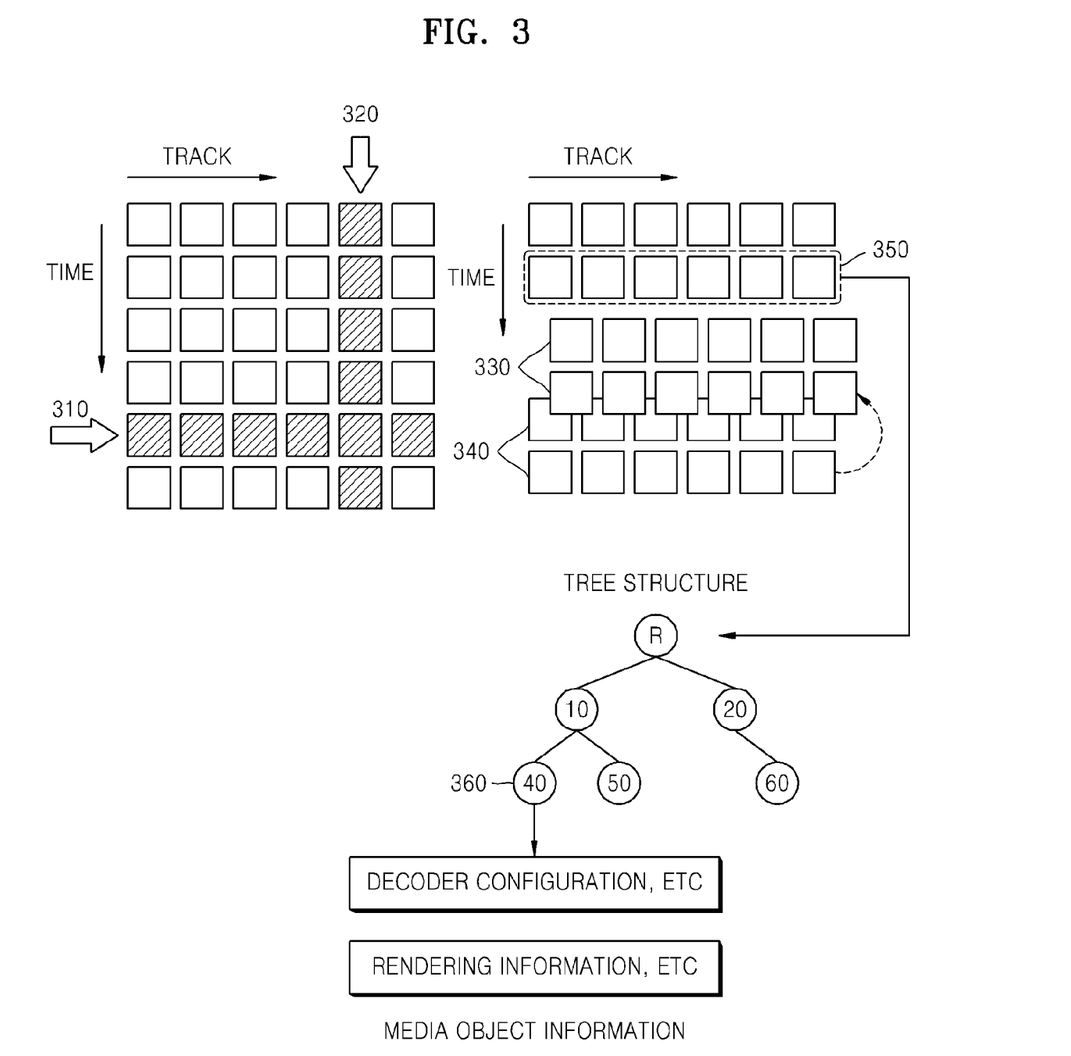
FIG. 3 is a view for explaining access and modification of metadata in a media file format according to an exemplary embodiment of the present invention.

FIG. 3 is a view for explaining access and modification of metadata in a media file format according to an exemplary embodiment of the present invention.

Referring to a left portion of FIG. 3, a user accesses a particular track and unit time of a time-track map using a predetermined accessing apparatus. For example, when the user desires to access content of track #5, which corresponds to a time interval between 4 minutes and 5 minutes after the start of content execution, the user can access a map node in a fifth row and a fifth column of the time-track map. Thus, the user does not have to access another track or another time.

Referring to a right portion of FIG. 3, in order to delete content of all tracks corresponding to a time interval between 2 minutes and 4 minutes after the start of content execution, the user deletes map nodes 330 in third and fourth rows and moves map nodes 340 in fifth and sixth rows to third and fourth rows, respectively. The user does not have to change information included in the moved map nodes 340 because the moved map nodes include only time offset information and position information of corresponding link structures (or media objects). As previously described with reference to FIG. 2, the map nodes 350 are linked to their corresponding link structure such as a tree structure, and each of the nodes 360 included in the link structure may be linked to media object information such as object description data and object handling data.

Figure 4:
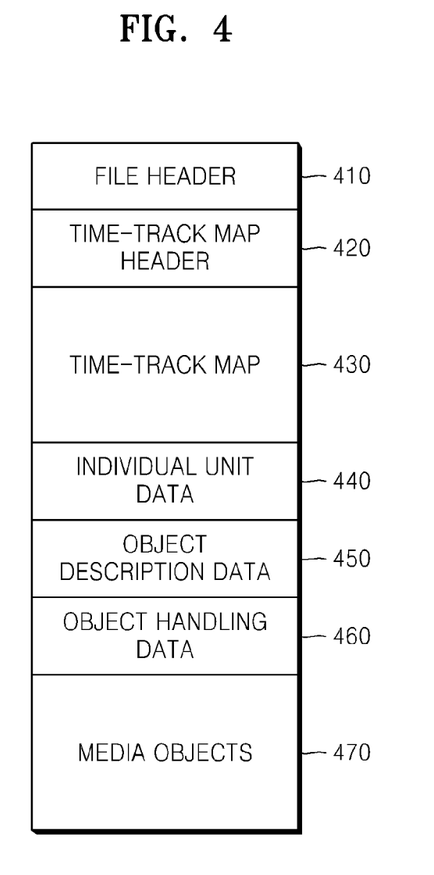
FIG. 4 illustrates a media file format structure according to an exemplary embodiment of the present invention.

FIG. 4 illustrates a media file format structure according to an exemplary embodiment of the present invention.

Referring to FIG. 4, the media file format structure includes a time-track map 430, individual unit data 440, and media objects 470.

A file header 410 includes fundamental information about a media file. A time-track map header 420 includes configuration information of the time-track map 430. For example, the time length of the time-track map 210, the number of tracks of the time-track map 210, the unit time of map nodes, time offset information and position offset information may be included in the time-track map header 420. The time-track map 430 is composed of a plurality of map nodes distinguished according to track and unit time as already described.

The individual unit data 440 is composed of link structures corresponding to the map nodes, and each of the link structures is composed of at least one individual unit data nodes. Each of the individual unit data nodes includes position information of its corresponding media objects. The object description data 450 has a media metadata structure including various profile information such as decoding information of the media objects 470. The object handling data 460 has a rendering metadata structure including information such as the rendering position or transformation of the media objects 470. The media objects 470 correspond to each of the individual unit data nodes.

As mentioned above, the individual unit data 440 or the object handling data 460 may be omitted in a modified embodiment of the present invention.

Figure 5:
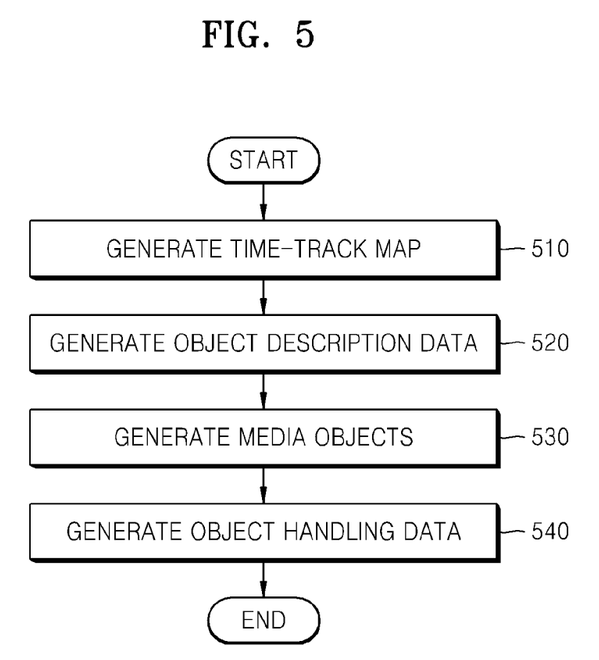
FIG. 5 is a flowchart illustrating a method of generating metadata in a media file format according to an exemplary embodiment of the present invention.

FIG. 5 is a flowchart illustrating a method of generating metadata in a media file format according to an exemplary embodiment of the present invention.

Referring to FIG. 5, in operation 510, a time-track map composed of a plurality of map nodes is generated. Each of the map nodes includes position information of its corresponding media objects.

It is preferable, but not necessary, that each of the map nodes has a data size that is previously determined according to circumstances. Each of the map nodes may also include time offset information or data size information of its corresponding media objects. When object handling data is generated in operation 540, each of the map nodes includes position information of the object handling data.

In operation 520, object description data corresponding to each of the map nodes is generated.

In operation 530, media objects corresponding to each of the map nodes are generated.

In operation 540, object handling data corresponding to each of the map nodes is generated. However, operation 540 may be skipped.

Figure 6:
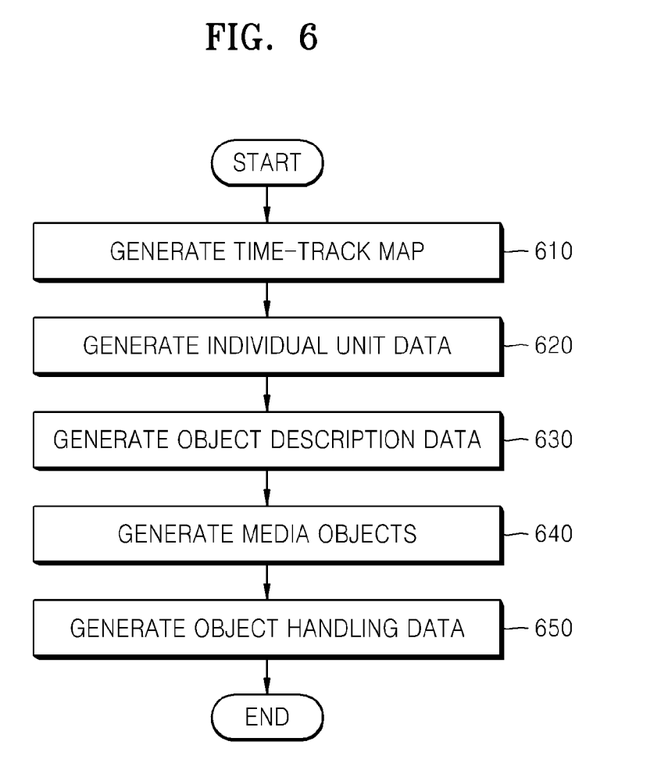
FIG. 6 is a flowchart illustrating a method of generating metadata in a media file format according to another exemplary embodiment of the present invention.

FIG. 6 is a flowchart illustrating a method of generating metadata in a media file format according to another exemplary embodiment of the present invention.

Referring to FIG. 6, in operation 610, a time-track map composed of a plurality of map nodes is generated. The map nodes include position information of corresponding link structures. The map nodes may also include time offset information or data size information of the corresponding link structures.

It is preferable, but not necessary, that each of the map nodes (or each of individual unit data nodes) has a data size that is previously determined according to circumstances. The data sizes of the map nodes (or the individual unit data nodes) are preferably the same as each other, but are not necessarily the same as the data sizes of the individual unit data nodes.

In operation 620, individual unit data composed of the link structures is generated. The link structures are composed of individual unit data nodes. Each of the individual unit data nodes includes position information of its corresponding media objects and position information of its corresponding object description data. Each of the individual unit data nodes may also include time offset information or data size information of its corresponding media objects. Each of the individual unit data nodes may include position information of its corresponding object handling data.

In operation 630, object description data corresponding to each of the individual unit data nodes is generated.

In operation 640, media objects corresponding to each of the individual unit data nodes are generated.

In operation 650, object handling data corresponding to each of the individual unit data nodes is generated. However, operation 650 may also be skipped.

Figure 7:
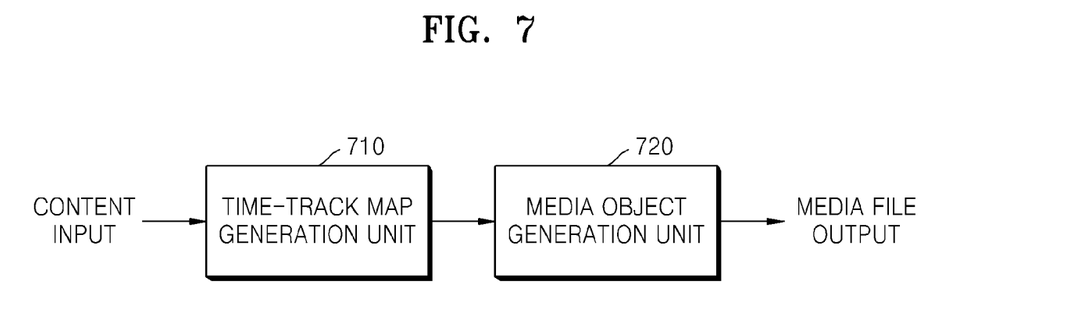
FIG. 7 is a block diagram of an apparatus for generating metadata in a media file format according to an exemplary embodiment of the present invention.

FIG. 7 is a block diagram of an apparatus for generating metadata in a media file format according to an exemplary embodiment of the present invention.

Referring to FIG. 7, the apparatus includes a time-track map generation unit 710 and a media object generation unit 720.

The time-track map generation unit 710 receives content and generates a time-track map composed of map nodes. Each of the map nodes includes position information of its corresponding media objects.

The media object generation unit 720 generates media objects corresponding to each of the map nodes and outputs a media file including the generated time-track map and media objects.

Figure 8:
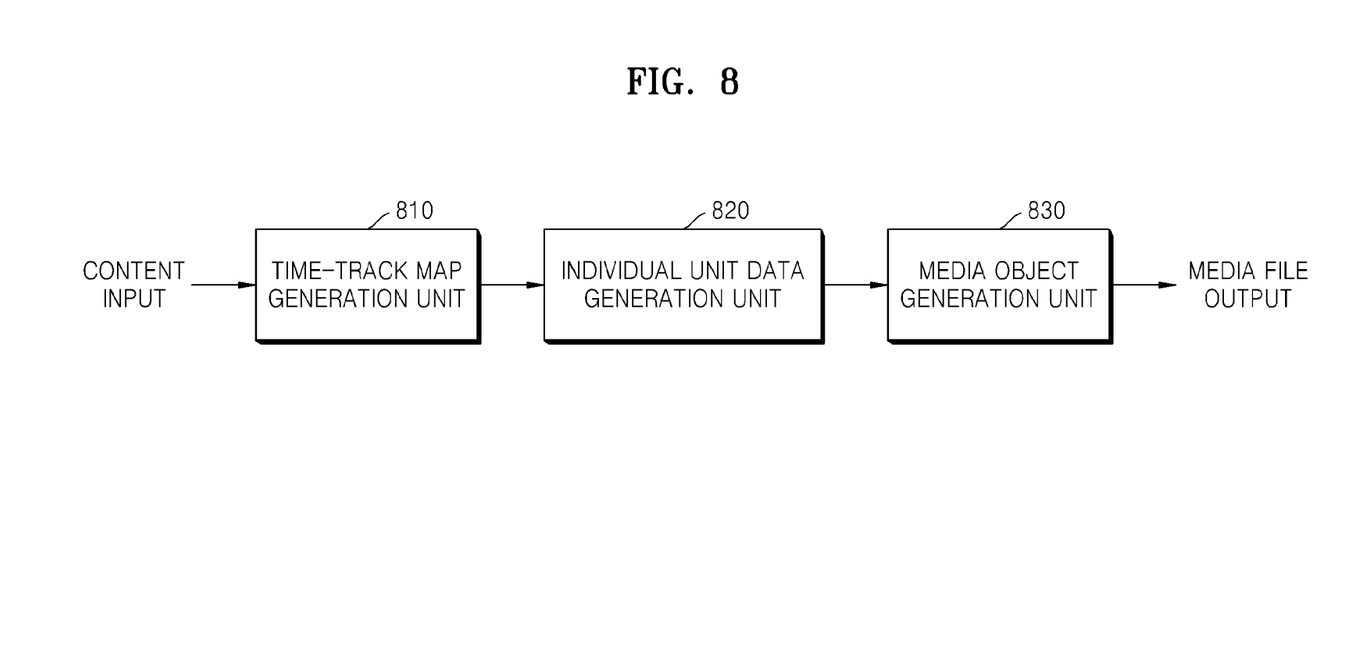
FIG. 8 is a block diagram of an apparatus for generating metadata in a media file format according to another exemplary embodiment of the present invention.

FIG. 8 is a block diagram of an apparatus for generating metadata in a media file format according to another exemplary embodiment of the present invention.

Referring to FIG. 8, the apparatus includes a time-track map generation unit 810, an individual unit data generation unit 820, and a media object generation unit 830.

The time-track map generation unit 810 receives content and generates a time-track map composed of map nodes. The map nodes include position information of corresponding link structures.

The individual unit data generation unit 820 generates individual unit data composed of the link structures. Each of the link structures includes at least one individual unit data node. Each of the individual unit data nodes includes position information of its corresponding media objects.

The media object generation unit 830 generates media objects corresponding to each of the individual unit data nodes and outputs a media file including the generated time-track map, individual unit data, and media objects.

Figure 9:
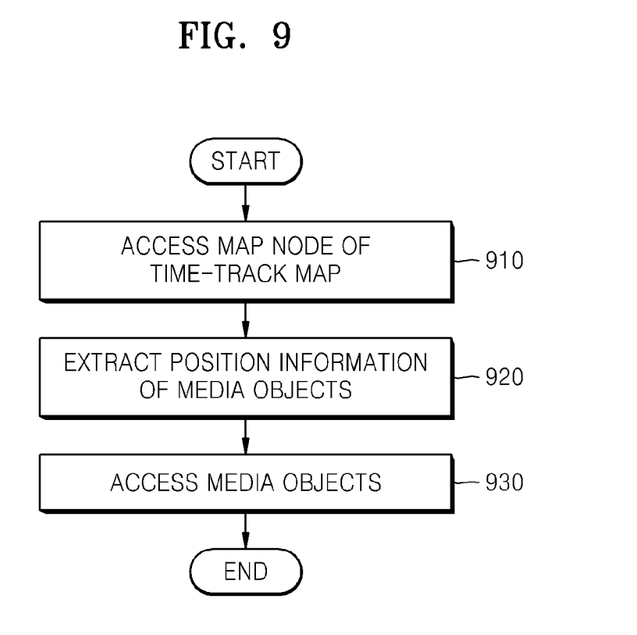
FIG. 9 is a flowchart illustrating a method of accessing metadata in a media file format according to an exemplary embodiment of the present invention.

FIG. 9 is a flowchart illustrating a method of accessing metadata in a media file format according to an exemplary embodiment of the present invention.

Referring to FIG. 9, in operation 910, an accessing apparatus accesses a map node of a time-track map.

In operation 920, position information of media objects corresponding to the map node is extracted. Further, position information of the object description data and the object handling data corresponding to the map node may be extracted.

In operation 930, the accessing apparatus accesses the media objects according to the extracted position information. Further, the accessing apparatus may access object description data and object handling data corresponding to each of the map nodes.

Figure 10:
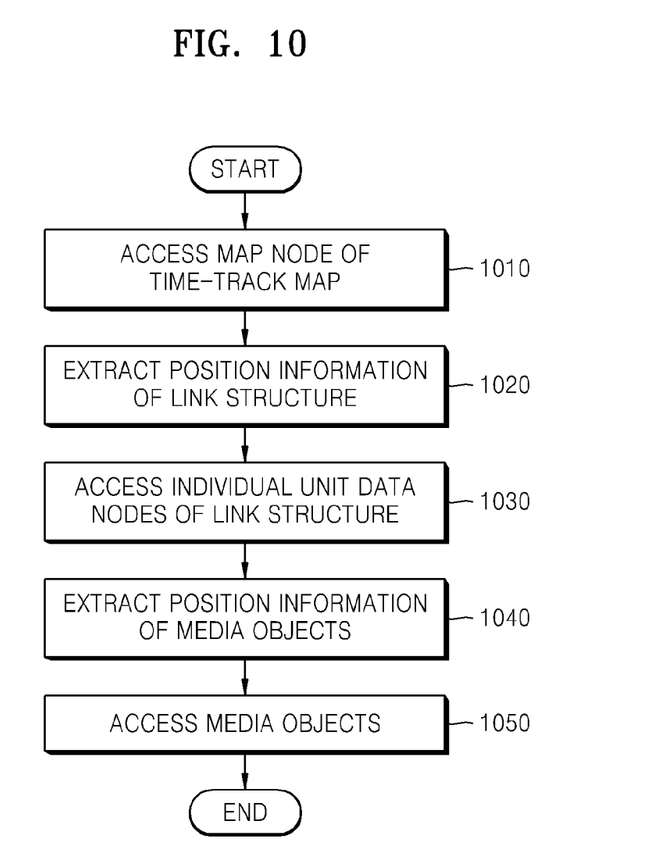
FIG. 10 is a flowchart illustrating a method of accessing metadata in a media file format according to another exemplary embodiment of the present invention.

FIG. 10 is a flowchart illustrating a method of accessing metadata in a media file format according to another exemplary embodiment of the present invention.

Referring to FIG. 10, in operation 1010, an accessing apparatus accesses a map node of a time-track map.

In operation 1020, position information of a link structure corresponding to the map node is extracted.

In operation 1030, the accessing apparatus accesses individual unit data nodes of the link structure according to the extracted position information of the link structure.

In operation 1040, position information of media objects corresponding to the individual unit data nodes is extracted. Further, position information of the object description data and the object handling data corresponding to the map node may be extracted.

In operation 1050, the accessing apparatus accesses the media objects according to the extracted position information. Further, the accessing apparatus may access object description data and object handling data corresponding to each of the map nodes.

Figure 11:
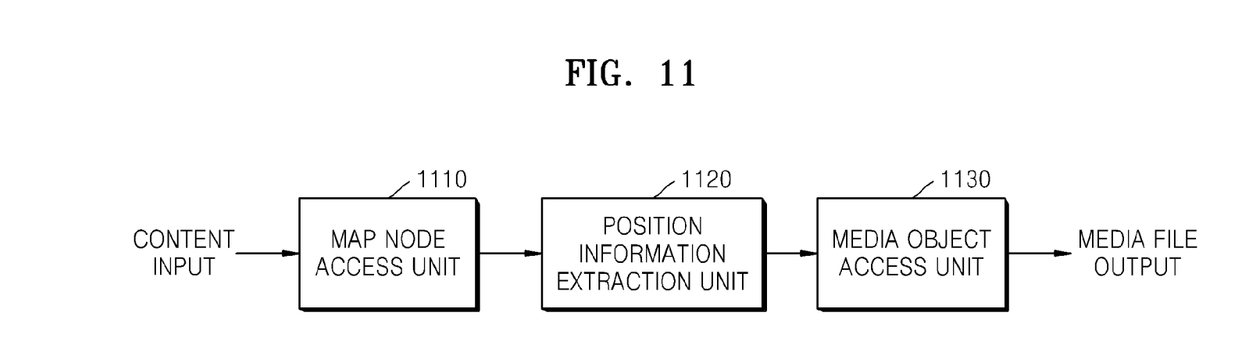
FIG. 11 is a block diagram of an apparatus for accessing metadata in a media file format according to an exemplary embodiment of the present invention.

FIG. 11 is a block diagram of an apparatus for accessing metadata in a media file format according to an exemplary embodiment of the present invention.

Referring to FIG. 11, the apparatus includes a map node access unit 1110, a position information extraction unit 1120, and a media object access unit 1130.

The map node access unit 1110 accesses a map node of a time-track map.

The position information extraction unit 1120 extracts position information of media objects corresponding to the map node.

The media object access unit 1130 accesses the media objects according to the extracted position information.

Figure 12:
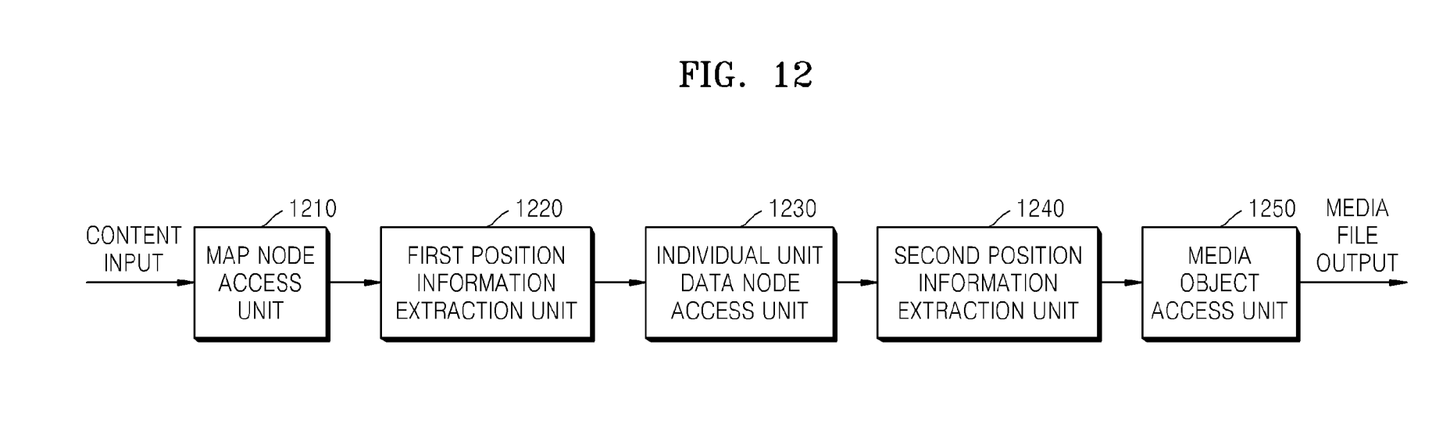
FIG. 12 is a block diagram of an apparatus for accessing metadata in a media file format according to another exemplary embodiment of the present invention.

FIG. 12 is a block diagram of an apparatus for accessing metadata in a media file format according to another exemplary embodiment of the present invention.

Referring to FIG. 12, the apparatus includes a map node access unit 1210, a first position information extraction unit 1220, an individual unit data node access unit 1230, a second position information extraction unit 1240, and a media object access unit 1250.

The map node access unit 1210 accesses a map node of a time-track map.

The first position information extraction unit 1220 extracts position information of a link structure corresponding to the map node.

The individual unit data node access unit 1230 accesses individual unit data nodes according to the extracted position information of the link structure.

The second position information extraction unit 1240 extracts position information of media objects corresponding to the individual unit data nodes.

The media object access unit 1250 accesses the media objects according to the extracted position information.

The present invention can be applied to media metadata framework standards such as the MPEG-4 system (ISO/IEC 14496-1) and the MPEG-4 LASeR/SAF(ISO/IEC 14496-20), media data storage format standards such as the ISO base media file format (ISO/IEC 14496-12), the Quick-Time (Apple Corps Ltd.), and the ASF (Microsoft Corporation), and media processing terminals supporting the above-described media system techniques such as TVs, set top boxes (STBs), portable media players (PMPs), MP3 players, mobile broadcasting terminals, cellular phones, and software (S/W) media players.

As described above, according to the present invention, rapid access is provided during content reproduction and content random access and movement of file data is minimized during content modification.

The present invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of accessing metadata in a media file format, the method comprising:
   accessing a map node corresponding to at least one track of a media file and a corresponding unit time of the at least one track of the media file, the at least one track and the corresponding unit time being selected by a user in a time-track map of the media file;
   extracting position information of media objects corresponding to the accessed map node; and
   accessing the media objects within the media file according to the extracted position information,
   wherein the media file comprises the time-track map and the media objects; and
   wherein a plurality of map nodes of the time-track map are distinguished according to a horizontal direction and a vertical direction of the time-track map in a two-dimensional structure.

2. A method of accessing metadata in a media file format, the method comprising:
   accessing a map node corresponding to at least one track of a media file and a corresponding unit time of the at least one track of the media file, the at least one track and the corresponding unit time being selected by a user in a time-track map of the media file format;
   extracting position information of a link structure corresponding to the map node;
   accessing the link structure and individual unit data nodes included in the link structure according to the extracted position information of the link structure;
   extracting position information of media objects corresponding to the individual unit data nodes; and
   accessing the media objects within the media file according to the extracted position information of the media objects,
   wherein the media file comprises the time-track map and the media objects; and
   wherein a plurality of map nodes of the time-track map are distinguished according to a horizontal direction and a vertical direction of the time-track map in a two-dimensional structure.

3. The method of claim 1, wherein each of the map nodes has a predetermined fixed data size.

4. The method of claim 1, wherein each of the map nodes includes time offset information or data size information of the corresponding media objects.

5. The method of claim 1, further comprising accessing object description data corresponding to each of the map nodes,
   wherein each of the map nodes includes position information of the object description data.

6. The method of claim 1, wherein the time-track map of the media file format comprises multiple tracks of the media file and a corresponding time of each of the multiple tracks of the media file.

7. The method of claim 2, wherein each of the map nodes and each of the individual unit data nodes have predetermined fixed data sizes.

8. The method of claim 2, wherein each of the map nodes includes time offset information or data size information of the corresponding link structure.

9. The method of claim 2, wherein each of the individual unit data nodes further includes time offset information or data size information of the corresponding media objects.

10. The method of claim 2, further comprising accessing object description data corresponding to each of the map nodes,
    wherein each of the individual unit data nodes includes position information of the object description data.

11. The method of claim 2, wherein the time-track map of the media file format comprises multiple tracks of the media file and a corresponding time of each of the multiple tracks of the media file.

12. The method of claim 5, further comprising accessing object handling data corresponding to each of the map nodes,
    wherein each of the map nodes includes position information of the object handling data.

13. The method of claim 6, wherein the user selects any one of the multiple tracks of the media file from the time-track map at the corresponding time of the track in the media file.

14. The method of claim 10, further comprising accessing object handling data corresponding to each of the map nodes,
    wherein each of the individual unit data nodes includes position information of the object handling data.

15. The method of claim 11, wherein the user selects any one of the multiple tracks of the media file from the time-track map at the corresponding time of the track in the media file.

* * * * *